United States Patent
Guenter

(10) Patent No.: US 6,818,311 B2
(45) Date of Patent: Nov. 16, 2004

(54) PLASTIC FILM

(75) Inventor: Walter Guenter, Forchheim (DE)

(73) Assignee: 4P Folie Forchheim GmbH, Forchheim (DE)

( * ) Notice: Subject to any disclaimer, the term of this patent is extended or adjusted under 35 U.S.C. 154(b) by 80 days.

(21) Appl. No.: 10/304,345

(22) Filed: Nov. 26, 2002

(65) Prior Publication Data

US 2003/0124362 A1 Jul. 3, 2003

Related U.S. Application Data

(63) Continuation-in-part of application No. 09/319,828, filed on Jun. 11, 1999.

(30) Foreign Application Priority Data

Oct. 9, 1998 (EP) .................................. PCT/EP98/06424

(51) Int. Cl.$^7$ ............................ B32B 27/18; B32B 31/30
(52) U.S. Cl. ............. 428/447; 264/171.13; 264/173.16; 264/176.1; 264/300; 428/41.8; 428/352; 428/354; 428/451
(58) Field of Search ....................... 264/171.13, 173.16, 264/176.1, 300; 428/41.8, 352, 354, 447, 451

(56) References Cited

U.S. PATENT DOCUMENTS

| 3,726,710 | A | * | 4/1973 | Berger et al. ............ 117/93.31 |
|---|---|---|---|---|
| 4,978,436 | A | | 12/1990 | Kelly .......................... 204/165 |
| 5,674,626 | A | * | 10/1997 | Khatib et al. ................ 428/447 |
| 5,932,352 | A | * | 8/1999 | Higgins .................... 428/423.1 |
| 5,942,557 | A | | 8/1999 | Ooms et al. ................... 522/77 |
| 5,948,517 | A | * | 9/1999 | Adamko et al. ............. 428/219 |
| 5,981,047 | A | | 11/1999 | Wilkie ......................... 428/215 |
| 6,045,904 | A | * | 4/2000 | Torikoshi et al. ........... 428/334 |
| 2001/0055675 | A1 | | 12/2001 | Guenter ...................... 428/220 |

FOREIGN PATENT DOCUMENTS

| EP | 0 336 704 A2 | 10/1989 |
|---|---|---|
| EP | 0 622 411 A | 11/1994 |
| WO | WO 98 10724 A | 3/1998 |
| WO | WO99/20707 | 4/1999 |

* cited by examiner

Primary Examiner—D. S. Nakarani
(74) Attorney, Agent, or Firm—Collard & Roe, P.C.

(57) ABSTRACT

A plastic film is provided that has release properties towards adhesives. The materials that produce the release properties are incorporated in the plastic layer and can be extruded with it. The materials responsible for producing the release properties are organo-silicone graft polymers or organo-silicone block copolymers obtained from mercapto-functionalized silicones, such as polydimethyl-siloxanes. The materials are produced by modifying SiH-containing polysiloxane with organic, polymerizable monomers of the type that can be produced with acrylates, such as methylmethacrylate, butylacrylate, styrene or vinyl acetate.

9 Claims, No Drawings

PLASTIC FILM

CROSS-REFERENCE TO RELATED APPLICATIONS

This application is a Continuation-In-Part and claims the benefit under 35 U.S.C. §120 of U.S. Ser. No. 09/319,828 filed Jun. 11, 1999 which claims priority under 35 U.S.C. §365 of PCT/EP98/06424 filed Oct. 9, 1998, which international application under PCT article 21(2) was not published in English, and claims priority under 35 U.S.C. §119 of German Application No. 197 45 6243 filed Oct. 16, 1997.

BACKGROUND OF THE INVENTION

1. Field of the Invention

The invention relates to a plastic layer that has release properties towards adhesives and/or adhesive materials.

2. The Prior Art

Layers with release properties towards adhesive or adhesive materials generally consist of silicone and are applied to a plastic film or a similar substrate in a separate operation.

The purpose of the invention is to provide these release properties earlier, in the course of the production process.

SUMMARY OF THE INVENTION

This problem is solved according to the invention by incorporating the materials that produce the release properties in the plastic layer so that the materials can be extruded with the plastic layer.

This not only facilitates production very considerably; the level of the release properties is easy to set as well.

In accordance with an advantageous further development of the invention, the basic polymer or material is provided with modified properties, as a result of which the release properties are achieved.

The required strength of the release properties can be taken into account during production of the basic polymer.

In another advantageous further development of the invention, the release additive incorporated is based on silicone compounds.

The level of the release properties can be controlled very easily when the additive is incorporated in this way too.

It is also very advantageous if in accordance with another further development of the invention substances similar to polyolefins are incorporated as release additives.

All of these developments make sure that the materials with which the release properties are achieved only migrate into the adhesive to an insignificant extent if at all.

It has also been proved to be very advantageous if the release additives are incorporated in the plastic during polymerization.

In another advantageous development, the release additives are embedded firmly in the plastic matrix.

In a further advantageous development of the invention, fillers that are, for example, structured as inorganic compounds are provided as release additives.

It has proved to be particularly advantageous in production of the plastic layer if the layer is manufactured from a masterbatch.

In this case, the masterbatch can contain a consistent proportion of the release additives; the final percentage accounted for by the release material is then determined by the plastic-to-masterbatch mixing ratio.

In a further embodiment, the release material may be mixed into the basic polymer material so as to concentrate the release materials on the surface of the basic polymer. The release materials are based on organo-silicone graft polymers and/or organo-silicone block copolymers obtained from mercapto-functionalized silicones, in particular polydimethyl-siloxanes. These are produced by modifying SiH-containing polysiloxanes with organic, polymerizable monomers of the type that can be produced with acrylates, for example with methylmethacrylate or butylacrylate or styrene or vinyl acetate.

The plastic layer in accordance with the invention can be used as a single-layer material. This single-layer material can be extruded onto a substrate layer.

A plastic film or paper web can, for example, be provided as the substrate layer.

In accordance with another further development of the invention, it is, however, also possible for the layer to be produced by the coextrusion process. In this case a substrate layer can be provided with the plastic layer with release properties not only on one side but also on both sides.

In accordance with another advantageous further development of the invention, the thickness of the plastic layer is in the 5 μm range.

The release properties can be influenced even more if in accordance with another further development of the invention the plastic layer and/or the substrate film for its is embossed.

DETAILED DESCRIPTION OF PREFERRED EMBODIMENTS

In a preferred embodiment, a plastic film is produced by the coextrusion process together with a plastic layer with release properties. The opposite side of the plastic film from the plastic layer can be coated with an adhesive and the film can then be wound up, the release properties of the plastic layer preventing the adhesive from sticking firmly to this layer. The release properties of the plastic layer can be reached in different ways. It is, for example, possible for the basic polymer to be provided with modified already. It is, however, also possible for release-additives based on silicone compounds to be incorporated. Another possibility is for substances similar to polyolefins to be incorporated as release additives.

The release additives can either be incorporated in the plastic during polymerization or be embedded firmly in the plastic matrix.

It is in addition possible to provide fillers that are, for example, structured as inorganic compounds as release additives.

It has proved to be advantageous in the production of the release layer if this layer is manufactured from a masterbatch. In this case, the masterbatch can contain a consistent proportion of the release components, while the final percentage is determined by the addition of plastic.

The coextrusion process has proved to be particularly effective in the production operation itself, it being possible to provide the release layer on either one or both sides.

It is, however, also possible to apply the release layer to a substrate web by the extrusion process; a plastic film or a paper web can be used here as the substrate web.

The thickness of the plastic layer is chosen according to the requirements in each individual case; a thickness of about 5 μm has proved to be particularly advantageous.

The release layer or—if it is applied to a substrate film—the complete material combination can in addition be embossed, in order to influence the release properties even more.

In a further embodiment, the release material is mixed into the basic material, whereby the release material may be concentrated on the surface of the basic material.

The release material is based on organo-silicone graft polymers and/or organo-silicone block copolymers obtained from mercapto-functionalized silicones, in particular polydimethyl-siloxanes. These are produced by modifying SiH-containing polysiloxanes with organic, polymerizable monomers of the type that can be produced with acrylates, for example with methylmethacrylate or butylacrylate or styrene or vinyl acetate.

The products are thermoplastic and therefore can be extruded.

The starting materials have the following structure:

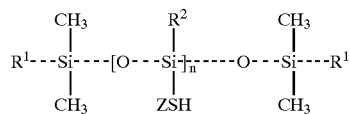

where $R^1$ and $R^2$ are the same or different acrylate radicals; $R^2$ may also be hydrogen. Z of the designation ZSH may either be a direct bond or a $(CH_2)_m$-group with m=1 to 3.

Silicone graft copolymers and silicone block copolymers, preferably based on polysiloxanes modified with mercapto-functionalized acrylate, have release properties of <50 cN/cm according to FINAT 10 with the adhesive reference tape TESA A 7475. In addition, they exhibit thermoplastic flow properties or behavior. In co-extrudates with additional polyolefins, they exhibit adequate adhesion to the polyolefins.

Furthermore, these copolymers exhibit a migration of silicone polymers into the adhesive basic polymer similar to that usually found in silicone coatings. The reduction in the adhesive power amounts to <20% according to FINAT 11.

The silicone-organo-copolymer can be provided co-extruded as a release additive in a basic polymer, or as a pure coextruded layer. In this way, it is possible to adjust the amount of release force to different values while minimizing production costs.

A radical polymerization of the above-mentioned monomers may also take place in the presence of functionalized silicones in homogeneous and heterogeneous media.

The thermoplastic properties of the copolymer can also be changed and adapted to the particular requirements by adjusting the molecule mass, polymer structure, and molecule or block lengths.

While only a few embodiments of the present invention have been shown and described, it is to be understood that many changes and modifications may be made thereunto without departing from the spirit and scope of the invention as defined in the appended claims.

What is claimed is:

1. A plastic film adapted to be releasably disposed on an adhesive, comprising material having release properties, wherein the materials having release properties comprmise polydimethylsiloxanes modified with mercapto-functionalized acrylate.

2. The plastic film according to claim 1 wherein the materials having the release properties are incorporated into the plastic film as additives.

3. The plastic film according to claim 1 wherein the plastic film further comprises a carrier layer.

4. A plastic film having a first side and a second side, comprising:

a release layer layer coextruded with a substrate and disposed on the first side of the plastic film, said release layer comprising materials having release properties incorporated within the release layer before extrusion of the release layer, wherein said materials comprise polydimethylsiloxanes modified with mercapto-functionalized acrylate; and an adhesive layer disposed on the second side of the plastic film.

5. A plastic film adapted to be releasably disposed on an adhesive, comprising materials having release properties, wherein the materials having release properties comprise a copolymer produced by modifying a SiH-containing polysiloxane with an organic polymerizable monomer selected from the group consisting of methylmethacrylate, butylacrylate, styrene, and vinyl acetate.

6. A method of making a plastic film comprising the steps of:

forming a mixture containing materials having release properties and polymers adapted to form a plastic film said materials having release properties being selected from the groups consisting of organo-silicone graft polymers an organo-silicone block copolymers obtained from mercapto-functionalized silicones;

polymerizing the polymers to incorporate the materials having release properties into the plastic film; and extruding the plastic film onto a substrate layer.

7. A method of making a plastic film comprising the steps of:

forming a mixture containing materials having release properties and polymers adapted to form a plastic film, said materials having release properties being selected from the groups consisting of organo-silicone graft polymers and organo-silicone block copolymers obtained from mercapto-functionalized silicones;

polymerizing the polymers to incorporate the materials having release properties into the plastic film; and co-extruding a substrate layer with the plastic film.

8. A method of making a plastic film comprising the steps of:

forming a mixture containing materials having release properties and polymers adapted to form a plastic film, said materials having release properties being selected from the groups consisting of organo-silicone graft polymers and organo-silicone block copolymers obtained from mercapto-functionalized silicones;

polymerizing the polymers to incorporate the materials having release properties into the plastic film; and extruding the plastic film with a plastic carrier layer.

9. A method of making a plastic film comprising the steps of:

forming a mixture containing materials having release properties and polymers adapted to form a plastic film, said materials having release properties being selected from the groups consisting of organo-silicone graft polymers an organo-silicone block copolymers obtained from mercapto-functionalized silicones;

polymerizing the polymers to incorporate the materials having release properties into the plastic film; and extruding the plastic film onto a carrier web.

* * * * *

UNITED STATES PATENT AND TRADEMARK OFFICE
CERTIFICATE OF CORRECTION

PATENT NO. : 6,818,311 B2
DATED : November 16, 2004
INVENTOR(S) : Guenter

It is certified that error appears in the above-identified patent and that said Letters Patent is hereby corrected as shown below:

Column 3,
Line 56, please change "comprmise" to correctly read -- comprise --.

Column 4,
Line 23, please change the word "an" to correctly read -- and --.
Line 57, please change the word "an" to correctly read -- and --.

Signed and Sealed this

Fifteenth Day of February, 2005

JON W. DUDAS
*Director of the United States Patent and Trademark Office*